US009769847B2

(12) United States Patent
Wong et al.

(10) Patent No.: US 9,769,847 B2
(45) Date of Patent: Sep. 19, 2017

(54) METHODS AND APPARATUSES FOR PREVENTING COLLISION AMONG UPLINK CONTROL MESSAGES FOR LC-MTC DEVICES

(71) Applicants: Shin Horng Wong, Chippenham (GB); Sigen Ye, Whitehouse Station, NJ (US); Seau Sian Lim, Swindon (GB)

(72) Inventors: Shin Horng Wong, Chippenham (GB); Sigen Ye, Whitehouse Station, NJ (US); Seau Sian Lim, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 133 days.

(21) Appl. No.: 14/690,446

(22) Filed: Apr. 19, 2015

(65) Prior Publication Data

US 2016/0309510 A1    Oct. 20, 2016

(51) Int. Cl.
*H04W 74/08* (2009.01)
*H04W 4/00* (2009.01)
*H04W 72/04* (2009.01)
*H04W 72/10* (2009.01)

(52) U.S. Cl.
CPC ....... *H04W 74/0816* (2013.01); *H04W 4/005* (2013.01); *H04W 72/048* (2013.01)

(58) Field of Classification Search
CPC ......... H04W 72/0413; H04W 72/0446; H04W 72/04; H04W 28/18; H04W 74/004; H04W 4/005
USPC ........................................ 370/336, 280, 252
See application file for complete search history.

(56) References Cited

U.S. PATENT DOCUMENTS

| 2015/0016432 | A1 | 1/2015 | Meyer et al. | |
|---|---|---|---|---|
| 2015/0215957 | A1* | 7/2015 | Yie | H04W 52/50 370/252 |
| 2015/0257150 | A1* | 9/2015 | Yi | H04B 7/26 370/329 |
| 2016/0192376 | A1* | 6/2016 | Lee | H04W 48/20 370/252 |
| 2016/0330780 | A1* | 11/2016 | Kim | H04W 76/023 |

FOREIGN PATENT DOCUMENTS

WO    WO-2015021318 A2    2/2015

OTHER PUBLICATIONS

LG Electronics, "UL Channell Transmission for MTC Coverage Enhancement," 3GPP R1-140308, PrNue, Czech Repupublic, Feb. 10-14, 2014.

(Continued)

*Primary Examiner* — Charles C Jiang
*Assistant Examiner* — Will Lin
(74) *Attorney, Agent, or Firm* — Harness, Dickey & Pierce, P.L.C.

(57) ABSTRACT

In one example embodiment, the machine type communication device includes a processor configured to determine whether a first uplink control channel and a second uplink control channel will collide during a transmission from the machine type communication device to the communication network, and adjust the transmission of the second uplink control channel relative to the first uplink control channel if the processor determines that the first and second control channels will collide.

19 Claims, 11 Drawing Sheets

(56) References Cited

OTHER PUBLICATIONS

International Search Report and Written Opinion from corresponding International Application PCT/IB2016/000613, dated Aug. 2, 2016.
Alcatel-Lucent et al., "Coverage Enhancement for Physical Data & Control," 3GPP R1-144076, Ljubljana, Slovenia, Oct. 6-10, 2014.
Intel Corporation, "Coverage Improvement for (E)PDCCH and PUCCH," 3GPP R1-140116, Prague, Czech Republic, Feb. 10-14, 2014.
Fujitsu, "Rate Matching vs Puncturing of ePDCCH," 3GPP R1-122067, Prague, Czech Republic, May 21-25, 2012.

* cited by examiner

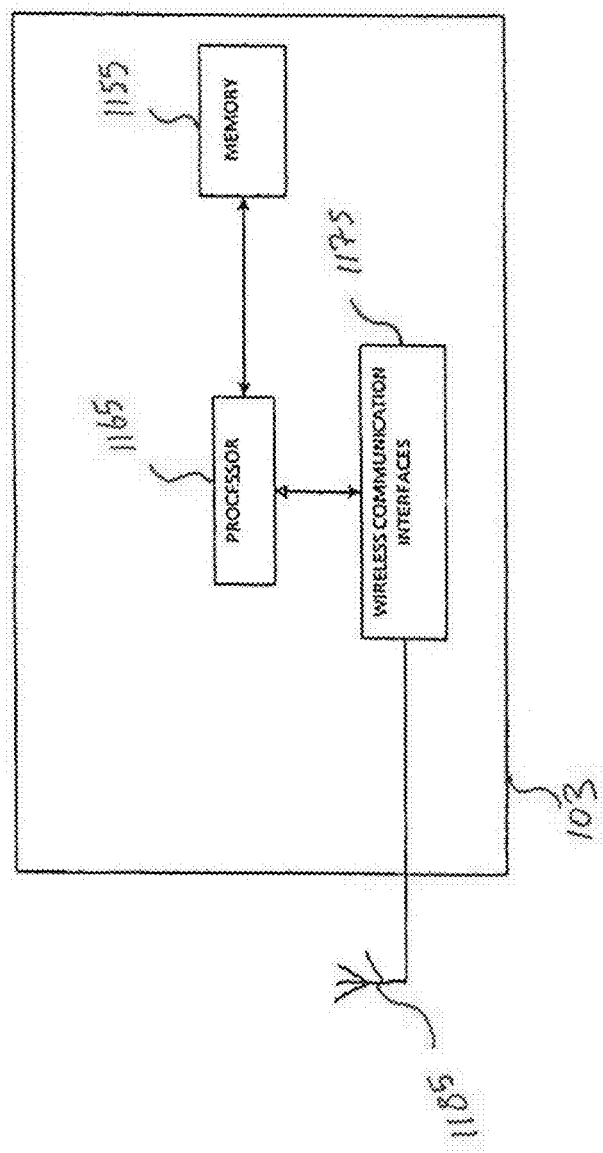

METHODS AND APPARATUSES FOR PREVENTING COLLISION AMONG UPLINK CONTROL MESSAGES FOR LC-MTC DEVICES

BACKGROUND

A machine type communication (MTC) device is a user equipment (UE) that is used by a machine for specific application (e.g., smart utility meters, parking meters, cars, and home appliances are few examples of MTC UEs). Work has been in progress for enabling MTC UEs to operate within a communication network such as the $3^{rd}$ Generation Partnership Project (3GPP) Long-Term Evolution (LTE) networks. In the 3GPP Technical Specification Release-12, a Work Item on Low Complexity MTC (LC-MTC) UE was completed according to which the complexity (cost) of a MTC UE is reduced by approximately 50%. In the 3GPP Release-13, another Work Item has been agreed upon, according to which the complexity of a MTC UE is further reduced to enhance the coverage and improve power consumption of MTC UEs.

One technique in achieving LC-MTC UEs is to reduce the radio frequency (RF) bandwidth of an LC-MTC UE to 1.4 MHz (operating with 6 PRBs (where a Physical Resource Block (PRB) is a unit of resource allocation in the frequency domain)). An LC-MTC UE is to be operable in any given system bandwidth and is to co-exist with legacy UEs within a communication network (e.g., cellular phones, Personal Digital Assistants (PDAs), laptops, etc.). Furthermore, a LC-MTC UE is to be able to retune the frequency at which the LC-MTC UE operates, in order to operate in different (1.4 MHz) sub-bands within the system bandwidth (e.g., Long Term Evolution (LTE) communication systems) to allow frequency multiplexing among LC-MTC UEs and also legacy UEs.

For LC-MTC UEs operating in a coverage enhancement mode, the coverage is enhanced through repetition of physical channels. The number of repetitions may be relatively high (hundreds of repetitions), which would in turn impact to the spectra efficiency of the communication system.

The physical channels include Physical Uplink Control Channel (PUCCH) and Physical Uplink Shared Control Channel (PUSCH). A PUCCH channel carries uplink control information (UCI). The resource i.e., physical resource block (PRB) of the PUCCH that carries the UCI are determined implicitly. The PUSCH channel carries uplink data information. Transmission of the PUSCH is scheduled by the downlink control information (DCI) provided to the LC-MTC UE by a serving base station (e.g., a serving eNode B).

In a legacy system, the resources used to transmit PUCCH are at the edge of the system bandwidth, which may be used for PUCCH transmission by LC-MTC UEs. Since a LC-MTC can only operate within a sub-band (e.g., 1.4 MHz), it is not possible to transmit both PUCCH and PUSCH at the same time if PUSCH is in another sub-band. Moreover, in a legacy system, if a PUCCH & PUSCH transmissions collide (i.e. scheduled to transmit at the same subframe), the UCI carried by the PUCCH may be transmitted by piggybacking the PUCCH onto the PUSCH transmission. For a LC-MTC UE operating in normal coverage mode (without repetition), the same mechanism of UCI piggybacking onto the PUSCH transmission may be used when PUCCH & PUSCH collision occurs.

However, for a LC-MTC UE operating in a coverage enhanced mode, PUCCH and PUSCH are repeated and therefore, it is more likely to have PUCCH and PUSCH collisions. Moreover, a PUSCH carrying larger payload would experience longer repetitions compared to that in PUCCH. Hence, unlike collisions in a legacy system as described above, due to differences in repetition and starting times of repetitions in PUCCH and PUSCH, parts of the repetitive samples of PUSCH or PUCCH transmissions encounter collisions.

SUMMARY

At least one example embodiment relates to a machine type communication device configured to transmit uplink control channels to a base station in a communication network.

In one example embodiment, the machine type communication device includes a processor configured to determine whether a first uplink control channel and a second uplink control channel will collide during a transmission from the machine type communication device to the communication network, and adjust the transmission of the second uplink control channel relative to the first uplink control channel if the processor determines that the first and second control channels will collide.

In yet another example embodiment, the processor is configured to adjust the transmission of the second uplink control channel if a number of collisions between the first and second control channels, is more than a threshold.

In yet another example embodiment, the processor is configured to adjust the transmission of the second uplink channel by delaying the transmission of the second uplink control channel until the transmission of the first uplink control channel is complete.

In yet another example embodiment, the processor is configured to adjust the transmission of the second uplink channel by piggybacking the second uplink control channel onto the first uplink control channel for transmission to the communication network. Piggybacking the second uplink control channel onto the first uplink control channel may be referred to as merging the second uplink control channel onto the first uplink control channel.

In yet another example embodiment, the processor is configured to piggyback the second uplink control channel onto the first uplink control channel by mapping samples of the second uplink control channel that will collide with the first uplink control channel, to one or more resource elements in physical resource blocks associated with the first uplink control channel.

In yet another example embodiment, the processor is configured to piggyback the second uplink control channel onto the first uplink control channel by puncturing one or more resource elements in physical resource blocks associated with the first uplink control channel, with uplink control information included in the second uplink control channel.

In yet another example embodiment, the processor is configured to piggyback the second uplink control channel onto the first uplink control channel by rate-matching resource elements associated with the first uplink control channel around one or more resource elements of the first uplink control channel designated for including uplink control information of the second uplink control channel.

In yet another example embodiment, the processor is configured to piggyback the second uplink control channel onto the first uplink control channel by interrupting transmission of the first uplink control channel, transmitting uplink control information of the second uplink control channel using resource elements in one or more physical resource blocks associated with the first uplink control channel, and resuming the transmission of the first uplink control channel after the transmission of the uplink control information of the second uplink control channel is completed.

In yet another example embodiment, the processor is configured to, schedule the transmission of the second uplink control channel prior to the transmission of the first uplink control channel, and piggyback the second uplink control channel onto the first uplink control channel by joint encoding uplink control information of the second uplink control channel with device specific information of the machine type communication device, for transmission to the communication network.

In yet another example embodiment, the processor is configured adjust the transmission of the second uplink control channel by discontinuing the transmission of the second uplink control channel if the processor determines that the first and second uplink control channels will collide during transmission from the machine type communication device to the communication network.

In yet another example embodiment, the processor is configured adjust the transmission of the second uplink control channel by discontinuing the transmission of the second uplink control channel if a number of collisions between the first uplink control channel and the second uplink control channel is more than a threshold.

In yet another example embodiment, the communication network is a long term evolution (LTE) communication network, the machine type communication device is in an enhanced coverage mode of operation, the first uplink control channel is a physical uplink shared channel (PUSCH), and the second uplink control channel is a physical uplink control channel (PUCCH).

In yet another example embodiment, the processor is configured to adjust the transmission of the second uplink control channel relative to the first uplink control channel, based on a message received from the base station, the message indicating a type of adjustment to be made to the transmission of the second uplink control channel relative to the first uplink control channel.

At least one example embodiment relates to a method of transmitting uplink control channels to a base station in a communication network, by a machine type communication network.

In one example embodiment, the method includes determining, by the machine type communication device, whether a first uplink control channel and a second uplink control channel will collide during transmission by the machine type communication device to the communication network, and adjusting the transmission of the second uplink control channel relative to the first uplink control channel if the determining determines that the first and second control channels will collide.

In yet another example embodiment, the adjusting adjusts the transmission of the second uplink control channel if a number of collisions between the first and second control channels, is more than a threshold.

In yet another example embodiment, the adjusting includes delaying the transmission of the second uplink control channel until the transmission of the first uplink control channel is complete.

In yet another example embodiment, the adjusting includes piggybacking the second uplink control channel onto the first uplink control channel for transmission to the base station.

In yet another example embodiment, the piggybacking includes at least one of mapping samples of the second uplink control channel that will collide with the first uplink control channel, to one or more resource elements in physical resource blocks associated with the first uplink control channel, puncturing one or more resource elements in physical resource blocks associated with the first uplink control channel, with uplink control information included in the second uplink control channel, and rate-matching resource elements associated with the first uplink control channel around one or more resource elements of the first uplink control channel designated for including uplink control information of the second uplink control channel.

In yet another example embodiment, the piggybacking includes interrupting transmission of the first uplink control channel, transmitting uplink control information of the second uplink control channel using resource elements in one or more physical resource blocks associated with the first uplink control channel, and resuming the transmission of the first uplink control channel after the transmission of the uplink control information of the second uplink control channel is completed.

In yet another example embodiment, the adjusting includes one of discontinuing the transmission of the second uplink control channel if the processor determines that the first and second uplink control channels will collide during transmission from the machine type communication device to the communication network, or discontinuing the transmission of the second uplink control channel if a number of collisions between the first uplink control channel and the second uplink control channel is more than a threshold.

BRIEF DESCRIPTION OF THE DRAWINGS

Example embodiments will become more appreciable through the description of the drawings, which are not limiting of example embodiments, in which:

FIG. 11 illustrates a machine type communication system shown in FIG. 1, according to one example embodiment.

DETAILED DESCRIPTION OF EXAMPLE EMBODIMENTS

Figure 1:
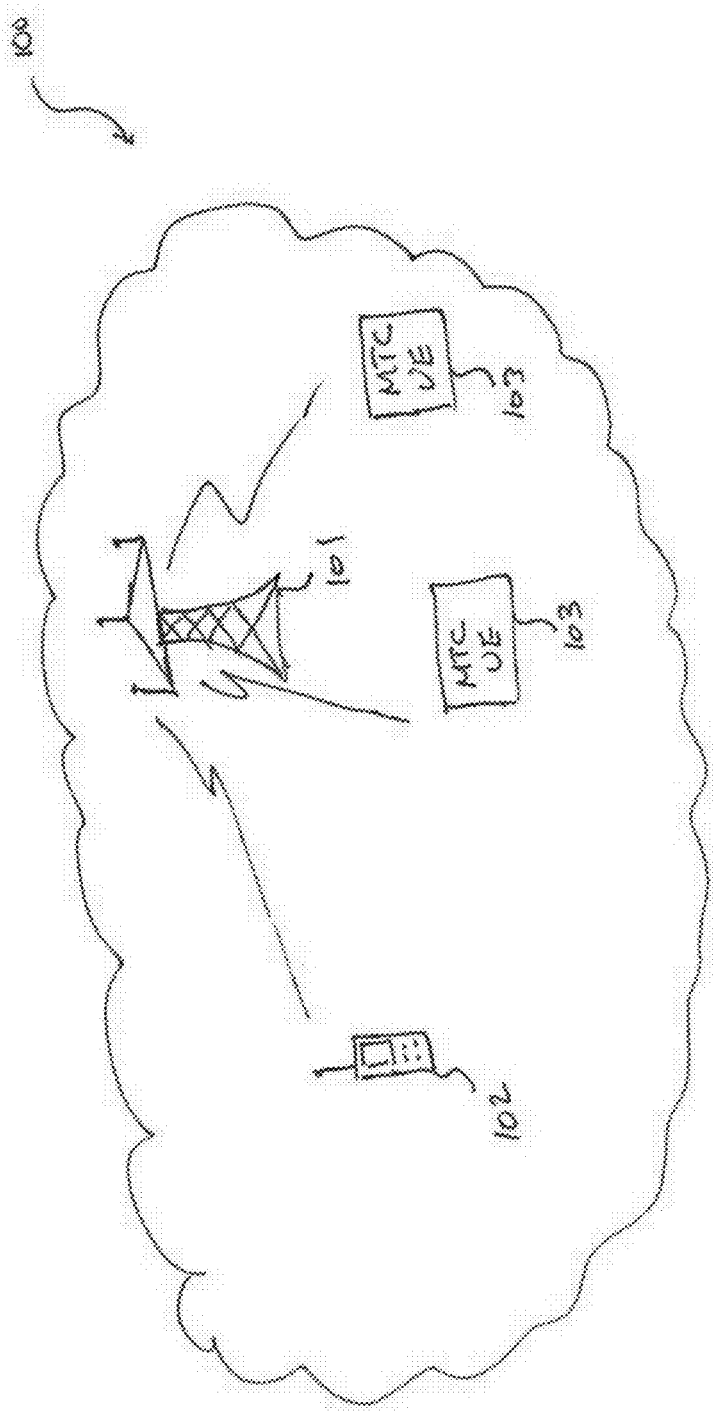
FIG. 1 illustrates a communication system including machine type communication user equipment operating therein, according to one example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

FIG. 1 illustrates a communication system including machine type communication user equipment operating therein, according to one example embodiment. As shown in FIG. 1, a communication network 100 may include a base station 101, a legacy device 102 and one or more MTC UEs 103. The communication network 100 may be a $4^{th}$ Generation (4G)-LTE communication system. However, the communication system 100 is not limited to a 4G-LTE system.

The base station 101 may be an e-Node B or any other base station (e.g., small cell base stations such as femto-cell base stations, pico-cell base stations, etc.) serving devices such as the legacy device 102 and the MTC UEs 103 that are present in a geographical area covered by the base station 101. Hereinafter, the base station 101 may also be referred to as a serving base station 101.

The legacy device 102 may be any known, or to be developed, communication device capable of establishing voice and/or data communication with other components within the communication system 100. For example, assuming that the communication system 100 is a 4G-LTE communication system, the legacy device 102 may be any known to be developed 4G-LTE enabled device (e.g., 4G-LTE enabled mobile device, PDA, laptop, tablet, etc.).

The MTC UEs 103, which may also be referred to as LC MTC UEs, may include any one of, but not limited to, parking meters, traffic lights, metro-rail cars, street lights, home appliances, or any other type of device that may be configured to establish a connection to and exchange data with other devices and/or users via a network such as the Internet. The MTC UEs may establish a connection to a network through the base station 101.

While a specific number of base stations, legacy device and MTC UEs are illustrated in FIG. 1, example embodiments are not limited to that shown in FIG. 1 but may include any number of base stations, legacy devices and MTC UEs. Furthermore, the communication system 100 may include other components necessary to establish connection among the devices operating within the communication system 100 or enable connection between the legacy device 102, MTC UEs 103 and the Internet.

Furthermore, each of the base station 101, legacy device 102 and the MTC UEs 103 may have a memory and an associated processor. The memory may be configured to store, among other types of information, computer-readable instructions such that when the computer-readable instructions are executed by the associated processor, the associated processor becomes a special-purpose machine that configures the corresponding one of the base station 101, the legacy device 102 and the MTC UEs 103 to perform functions, which will be described below. The structural configuration of the base station 101 and the MTC UE 103 will be described below with reference to FIGS. 10-11.

As discussed above, in the context of MTC UEs 103 operating within the communication system 100, uplink control channels such as a physical uplink shared channel (PUSCH) and a physical uplink control channel (PUCCH) may repetitively be transmitted from one or more of the MTC UEs 103 to the base station 101. However, due to the relatively high number of repetitions, collisions among parts and/or all of the PUSCH and PUCCH repetitions may occur.

Figure 2:
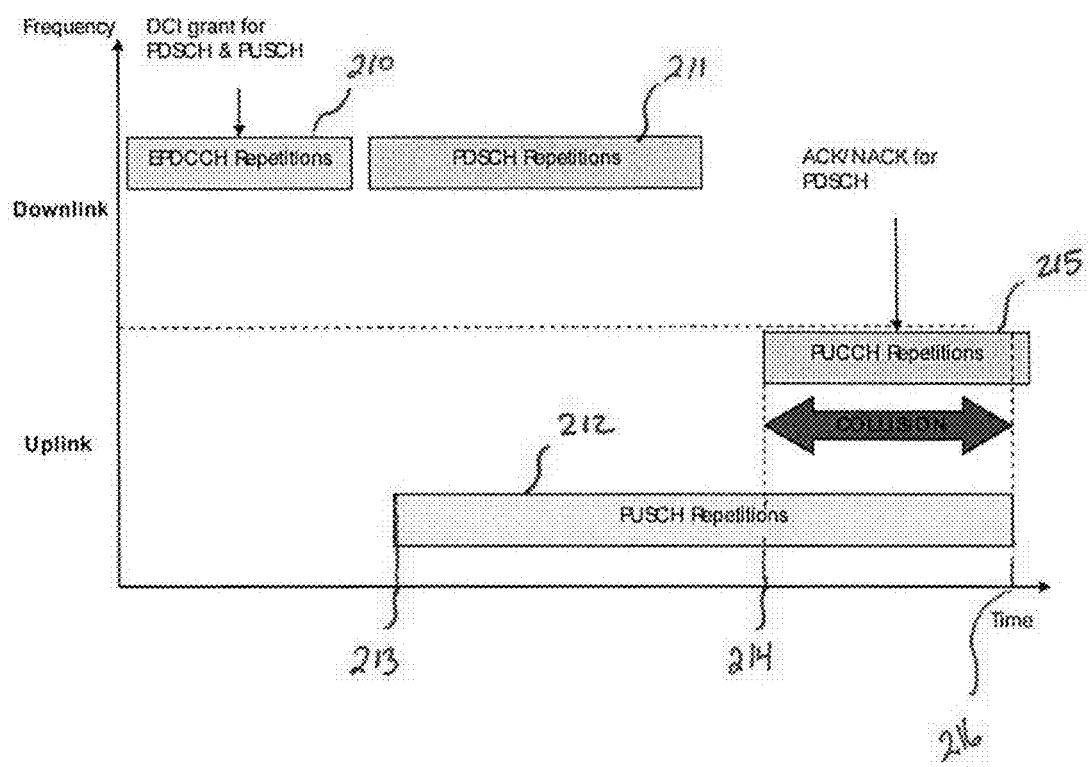
FIGS. 2-4 illustrate time-frequency representation of various downlink and uplink channels transmitted between a base station and a user equipment as well as different examples of collisions that may occur between uplink channels.
Figure 3:
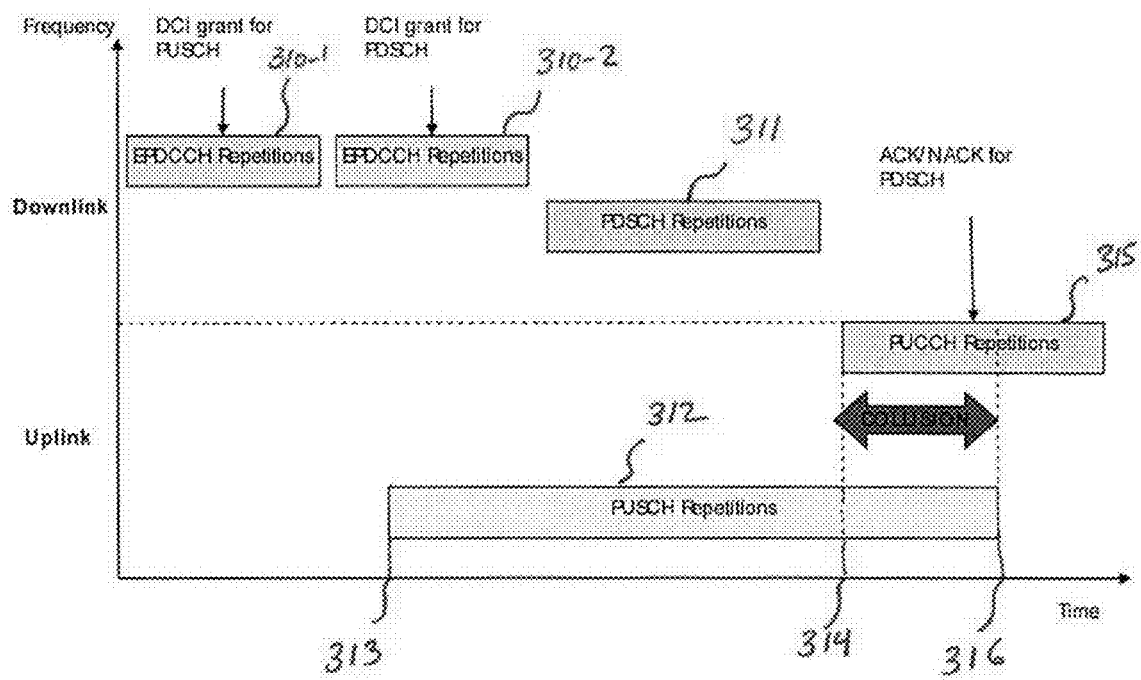
Figure 4:
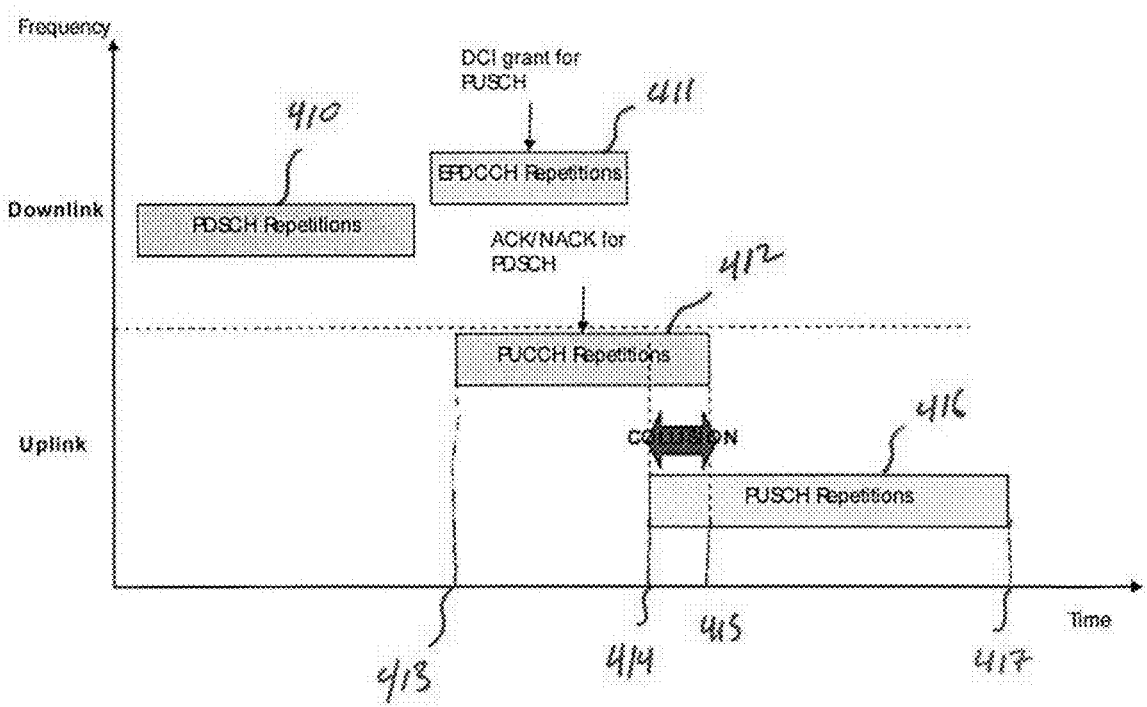

FIGS. 2-4 illustrate time-frequency representations of various downlink and uplink channels transmitted between a base station and a user equipment as well as different examples of collisions that may occur between uplink channels. In FIG. 2, on the downlink (DL) side, the base station 101 may repetitively transmit an Enhanced Physical Downlink Control Channel (EPDCCH) 210, which among other types of information as known in the art, may include downlink control information (DCI) for granting a Physical Downlink Shared Control Channel (PDSCH) transmission as well as a schedule for transmission of the PUSCH by the MTC UEs 103 to the base station 101. Still on the DL side, the repetitive transmission of the EPDCCH 210 may be followed by repetitive transmission of the PDSCH 211. The PDSCH 211 may carry particular information as is known in the art.

On the uplink (UL) side, repetitive transmission of PUSCH 212 may start at a point 213 in time. At a point 214 in time and after the start of the repetitive transmissions of the PUSCH 212, the repetitive transmission of the PUCCH 215 may start. Accordingly, at the point 214 in time, the PUSCH 212 repetitions and the PUCCH 215 repetitions collide. The collision may continue until a point 216 in time, at which the repetitive transmission of the PUSCH 212 is completed. Thereafter, any remaining repetitive transmission of the PUCCH 215 may be carried out.

As indicated above, the PUSCH 215 carries uplink data information including ACK/NACK messages for the PDSCH 211 sent to the MTC UE 103 by the base station 101. In one example embodiment, the PUCCH 215 carries uplink control information (UCI) on designated resource elements (REs) within one or more physical resource blocks (PRBs) of the PUCCH 215.

Compared to FIG. 2, in FIG. 3, the base station 101 may repetitively transmit separate EPDCCHs 310-1 and 310-2. The first EPDCCH 310-1 repetitions may include, among other types of information, a DCI grant and transmission schedule for a PUSCH transmission. The second EPDCCH 310-2 repetitions may include, among other types of information, a DCI grant for PDSCH transmissions. Still on the DL side, the repetitive transmission of the second EPDCCH 310-1 may be followed by repetitive transmission of PDSCH 311. The PDSCH 311 may carry particular information as is known in the art.

Similar to that described with reference to FIG. 2, on the uplink (UL) side, repetitive transmission of PUSCH 312 may start at a point 313 in time. At a point 314 in time and after the start of the repetitive transmissions of the PUSCH 312, the repetitive transmission of the PUCCH 315 may start. Accordingly, at the point 315 in time, the PUSCH 312 repetitions and the PUCCH 315 repetitions collide. The collision may continue until a point 316 in time, at which the repetitive transmission of the PUSCH 312 is completed. Thereafter, any remaining repetitive transmission of the PUCCH 315 may be carried out.

As indicated above, the PUSCH 315 carries uplink data information including ACK/NACK messages for the PDSCH 311 sent to the MTC UE 103 by the base station 101. In one example embodiment, the PUCCH 315 carries uplink control information (UCI) on designated resource elements (REs) within one or more physical resource blocks (PRBs) of the PUCCH 315.

Furthermore and as shown in FIG. 3, the PUSCH 312 repetitions may be longer compared to that shown in FIG. 2. The PUSCH 312 repetitions may be longer due to, for example, the larger payload that the PUSCH 312 may carry.

In contrast to FIGS. 2 and 3, in FIG. 4, the base station 100 may repetitively transmit PDSCH before the EPDCCH. On the DL side, the base station 101 repetitively transmits PDSCH 410 followed by repetitively transmitting the EPDCCH 411 transmissions. In this case and in contrast to the examples shown in FIGS. 2 and 3, the EPDCCH 411 may only include the DCI grant and the transmission schedule for the PUSCH.

As shown in FIG. 4, on the uplink (UL) side, the MTC UE 103 starts the transmission of the PUCCH 412 at a point 413 in time. Then at a point 414 in time and while the repetitive transmission of the PUCCH 214 is in progress, the MTC UE 103 starts the repetitive transmission of the PUSCH 416. The repetitive transmission of the PUCCH 412 may then end at a point 415 in time. Accordingly, between the points 414 and 415 in time, the repetitive transmissions of the PUCCH 412 and PUSCH 416 may collide. Thereafter, the repetitive transmission of the PUSCH 416 may continue until, for example, point 417 in time.

Hereinafter, example embodiments will be described for handling collisions between the PUSCH and PUCCH repetitions on the UL side.

Figure 5:
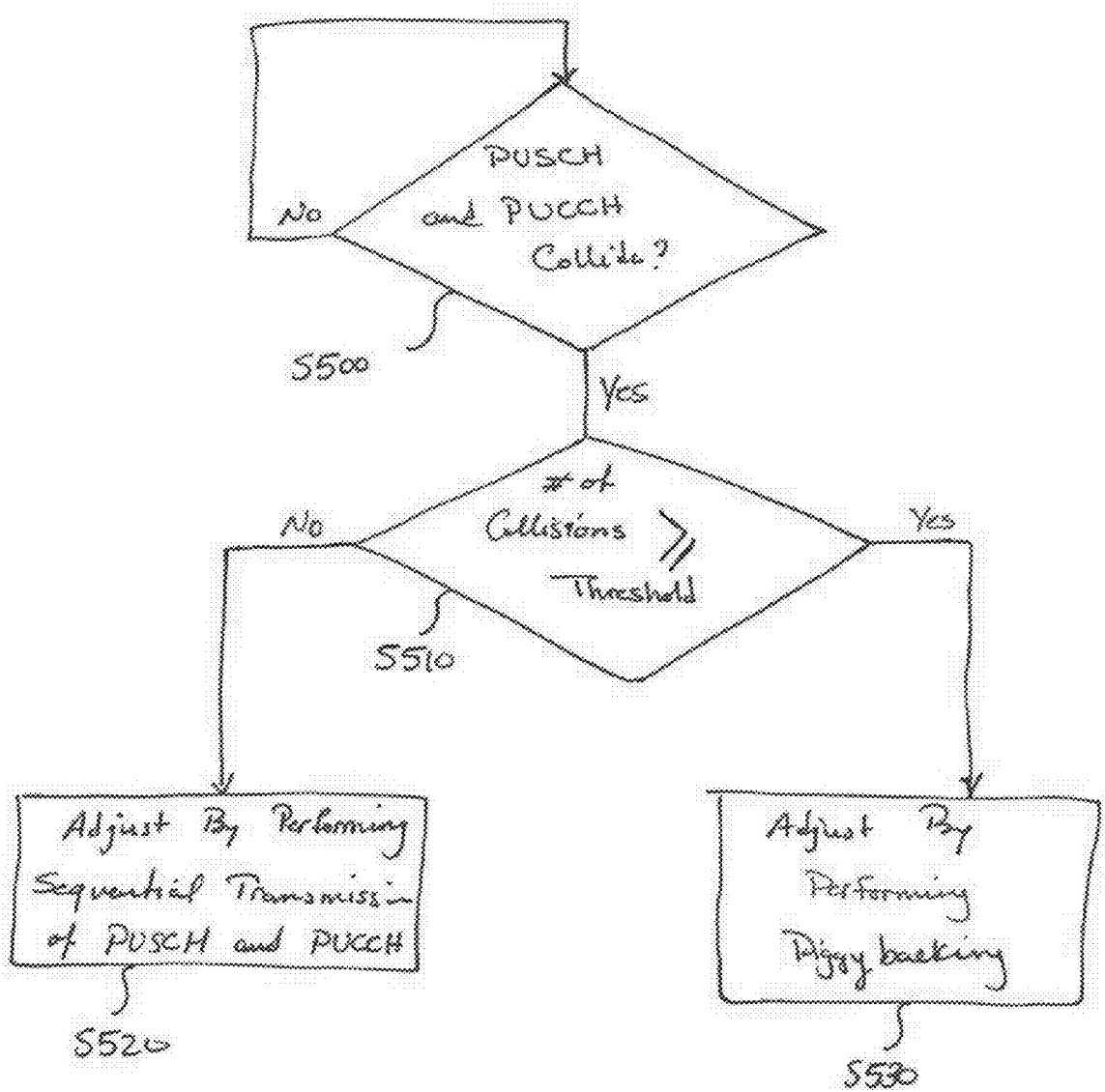
FIG. 5 is a flowchart describing the handling of collisions between PUSCH and PUCCH transmissions by a MTC UE, according to one example embodiment.

FIG. 5 is a flowchart describing the handling of collisions between PUSCH and PUCCH transmissions by a MTC UE, according to one example embodiment. FIG. 5 will be described with respect to one of the MTC UEs 103. However, the same is application to any number of the MTC UEs 103. Hereinafter, repetitive transmissions of the PUSCH and PUCCH may be referred to as PUSCH repetitions and PUCCH repetitions, respectively.

At S500, the MTC UE 103, via an associated processor (not shown), determines whether the PUSCH (first uplink control channel) repetitions and PUCCH (second uplink control channel) repetitions will collide during transmission from the MTC UE 103 to the base station 101. In one example embodiment, the MTC UE 103 determines whether the PUSCH and PUCCH repetitions will collide by, for example, determining the start times of PUSCH & PUCCH and the repetitions of both channels to see if collisions occur during repetitive transmissions of one of the channels. In one example embodiment, the MTC UE 103 determines the start times of the PUSCH PUCCH and the number of repetitions of each within a few subframes (e.g., one, two, three, four subframes) before the transmission of the PUSCH and PUCCH starts.

If at S500, the MTC UE 103 determines that there are no collisions among the PUSCH and PUCCH repetitions, the MTC UE 103 may repeat S500 for the next scheduled PUSCH and/or PUCCH transmissions, until the MTC UE 103 detects a collision between the PUSCH and PUCCH repetitions.

However, if at S500, the MTC UE 103 determines that the PUSCH and PUCCH repetitions will collide, at S510, the MTC UE 103 determines whether a collision period (e.g. number of colliding subframes) between the PUSCH and PUCCH transmissions, within a given time window, is equal to or greater than a threshold. In one example embodiment, the time window is equal to duration of the PUSCH repetitions or PUCCH repetitions, which ever one is longer.

In one example embodiment, the threshold may be set based on empirical studies and may take values such as 30%, 50%, etc. However, the value of the threshold is not limited to the above specific values and may take on any other values.

In one example embodiment and in order to be able to compare the number of colliding subframes to the threshold, the MTC UE 103 calculates the number of colliding subframes and stores the number of colliding subframes in a memory of the MTC UE 103. Therefore, at S510, the MTC UE 103 may compare the stored number of colliding subframes to the threshold in order to determine whether the number of colliding subframes is greater than the threshold or not.

If at S510, the MTC UE 103 determines that the number of collisions is less than the threshold, then at S520, the MTC UE 103 adjusts the transmission of one of the PUSCH repetitions and the PUCCH repetitions relative to the other one of the PUSCH repetitions and the PUCCH repetitions so as to avoid further collisions between the PUSCH and PUCCH repetitions during transmission from the MTC UE 103 to the base station 101. In one example embodiment, the adjusting at S520 includes a sequential transmission of the PUCCH repetitions, where the PUCCH repetitions are transmitted after the transmission of the PUSCH repetitions is completed.

If at S510, the MTC UE 103 determines that the number of collisions is equal to or greater than the threshold, then at S530, the MTC UE 103 adjusts the transmission of one of the PUSCH repetitions and the PUCCH repetitions relative to the other one of the PUSCH repetitions and the PUCCH repetitions so as to avoid further collisions between the PUSCH and PUCCH repetitions during transmission from the MTC UE 103 to the base station 101. In one example embodiment, the adjusting at S530 includes piggybacking the PUCCH repetitions onto the PUSCH repetitions for transmission. The piggybacking of the PUCCH repetitions onto the PUSCH repetitions may also be referred to as merging the PUCCH repetitions with the PUSCH repetitions. The process described above with reference to S500-S530 of FIG. 5, may be carried out whenever a scheduled PUSCH and/or PUCCH transmissions session starts.

Hereinafter, various example embodiments for performing the piggybacking will be described.

In one example embodiment, the MTC UE 103 performs the piggybacking by mapping UCI of repetitive samples of the PUCCH that will collide with the PUSCH samples, onto one or more resource elements (REs) within one or more physical resource blocks (PRBs) of the PUSCH. For example, one or more of the REs within the one or more PUSCH PRBs are replaced with symbols of the PUCCH. The PUSCH PRBs and the associated REs that are to be replaced may be known according to the 3GPP specification.

In one example embodiment, the MTC UE 103 performs the piggybacking such that UCI of repetitive symbols of the PUCCH that will collide with the PUSCH symbols, puncture one or more REs within one or more PRBs of the PUSCH as specified in the 3GPP specification. In one example embodiment, the PUSCH symbols that puncture the one or more REs do so by overwriting the corresponding symbols of the PUSCH. An example of puncturing is provided below.

Assume that the PUSCH is normally transmitted with 60 symbols (1 symbol is placed onto 1 PUSCH RE). Furthermore, assume that 10 symbols are required for UCI of the PUCCH. According to puncturing, all PUSCH symbols, except 10 PUSCH symbols, are placed onto their respective REs. The REs corresponding to the 10 missing PUSCH symbols are overwritten by the 10 symbols of the UCI. In decoding the PUSCH, the base station 101 will still receive 60 symbols as input but with some symbols missing or in the alternative, containing unrelated information.

In one example embodiment, the MTC UE 103 performs the piggybacking such that the PUSCH REs are rate-matched around the REs of the PUSCH that are determined to carry the UCI information of the PUCCH. In one example embodiment, rate-matching refers to a scenario in which one or more PUSCH REs are reserved for PUCCH symbols, such that the PUSCH symbols are mapped around that of PUCCH symbols with no PUSCH symbol (even those corresponding to the PUSCH REs reserved for the PUCCH symbols) missing. An example of rate-matching is provided below.

Assume that the PUSCH is normally transmitted with 60 symbols (1 symbol is placed onto 1 PUSCH RE). Furthermore, assume that 10 symbols are required for UCI of the PUCCH. According to rate-matching, the MTC UE 103 knows that there are now only 50 REs left to fit 50 symbols. So instead of sending the message with 60 symbols, the MTC UE 103 sends the PUSCH with 50 symbols and places the PUSCH symbols in their corresponding REs. On the base station side and in decoding the PUSCH, the base station 101, will take 50 symbols as input as opposed to receiving 60 symbols with some symbols missing or containing unrelated information.

In one example embodiment, the MTC UE 103 performs the piggybacking such that all the REs in one or more PRBs of the PUSCH carry the UCI of the PUCCH. Dedicating all the REs in one or more PRBs of the PUSCH to UCI of PUCCH effectively results in pausing the transmission of the PUSCH repetitions so that only PUCCH repetitions are transmitted. The MTC UE 103 resumes the transmission of the PUSCH repetitions after the transmission of the PUCCH repetition is completed. This will be described below with reference to FIG. 6.

Figure 6:
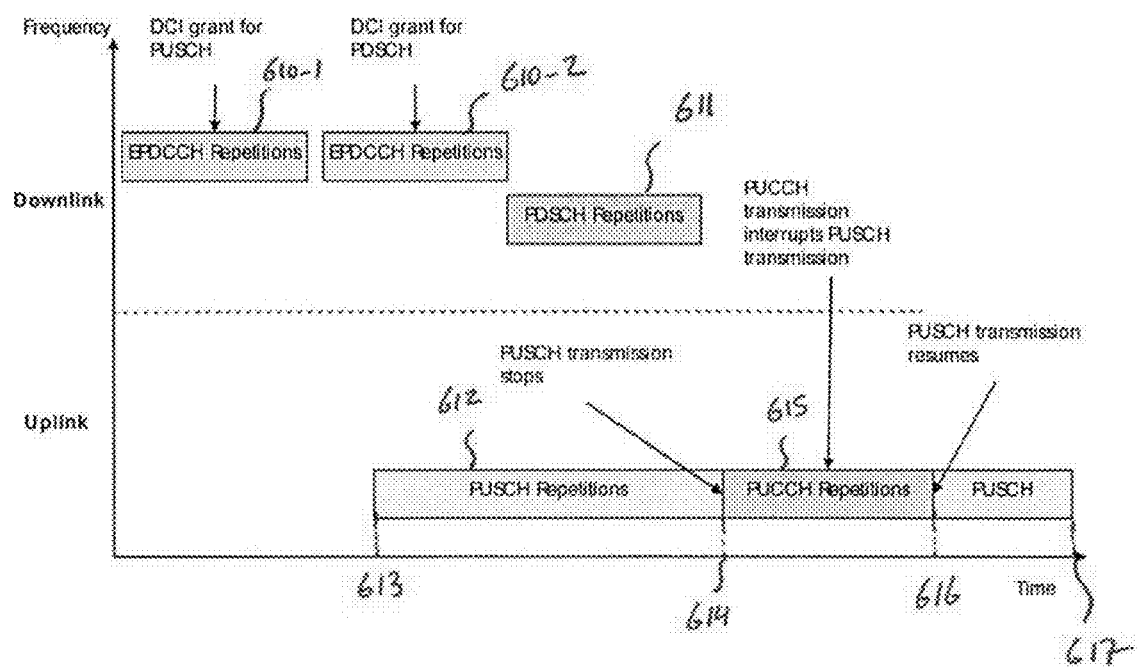
FIG. 6 illustrates pausing the transmission of the PUSCH to transmit the PUCCH followed by resuming the transmission of the PUSCH, according to one example embodiment.

FIG. 6 illustrates pausing the transmission of the PUSCH to transmit the PUCCH followed by resuming the transmission of the PUSCH, according to one example embodiment. In FIGS. 6, 610-1, 610-2, 611 and 612 are the same as 310-1, 310-2, 311, 312 described above with reference to FIG. 3, respectively. Therefore, for the sake of brevity 610-1, 610-2, 611 and 612 will not be described in greater detail.

Similar to FIG. 3 and in one example embodiment, repetitive transmission of PUSCH 612 starts at a point 613 in time. The repetitive transmission of the PUSCH 612 may then be paused (stopped) at the point 614 in time. At the point 614 in time, the repetitive transmission of the PUCCH 615 may start until the point 616 in time. The point 614 in time may correspond to a point in time at which one or more PRBs of the PUSCH 612, all REs of which are dedicated for transmission of the PUCCH 615, have been scheduled for transmission. The point 616 in time may correspond to a time at which the transmission of one or more PRBs of the PUSCH 612, all REs of which are dedicated for transmission of the PUCCH, is completed. At the point 616 in time, the MTC UE 103 may resume the repetitive transmission of the PUSCH 612 until a point in time such as the point 617 in time.

Between the points 614 and 616 in time, the transmission of the PUSCH 612 is interrupted and the PUCCH 615 is transmitted instead.

Referring back to various example embodiments according to which the MTC UE 103 performs the piggybacking, in yet another example embodiment, the MTC UE 103 performs the piggybacking by joint encoding of the UCI (from the PUCCH) and a unicast message and send them as a single message on the PUSCH. In one example embodiment, the encoding of the UCI includes sending the UCI to the base station 101 at the MAC layer, where the UCI is multiplexed with the unicast message prior to encoding. The unicast message may be associated with PUSCH and includes MTC UE 103 specific data.

In one example embodiment, in order to encode the UCI, the content of the UCI (e.g., whether it is an ACK or a NACK), is known to the MTC UE 103 at the time the transmission of the PUSCH starts. Accordingly, in order to encode the UCI, the MTC UE 103 initiates the transmission of the PUCCH repetitions prior to initiating the transmission of the PUSCH repetitions (e.g., similar to that shown in FIG. 4).

In addition to the handling of collisions between the PUSCH and PUCCH repetitions, according to FIG. 5, the MTC UE 103 may utilize other methods for handling the collisions as will be described below.

Figure 7:
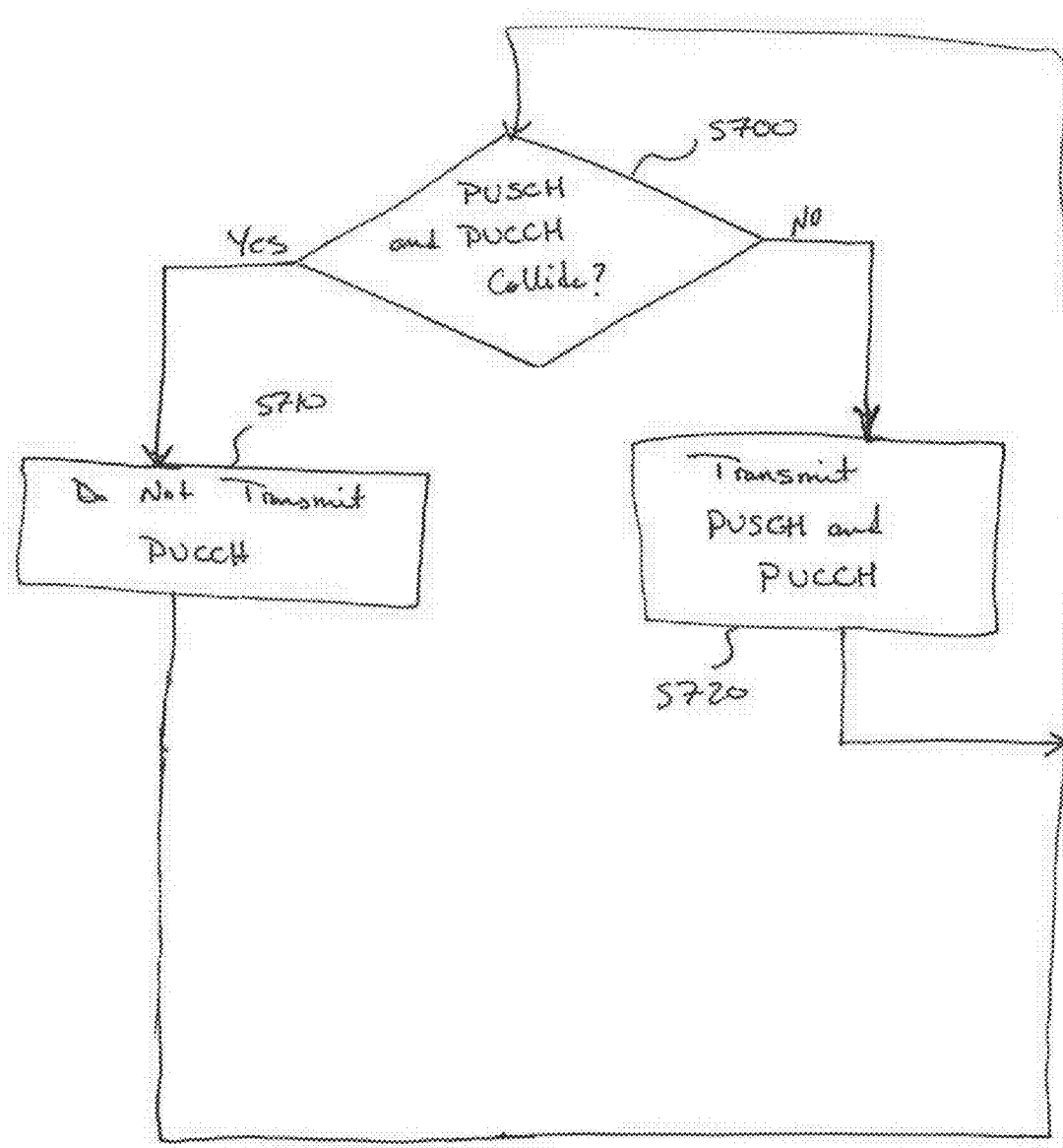
FIG. 7 is a flowchart describing the handling of collisions between PUSCH and PUCCH transmissions by a MTC UE, according to one example embodiment.

FIG. 7 is a flowchart describing the handling of collisions between PUSCH and PUCCH transmissions by a MTC UE, according to one example embodiment. In FIG. 7, S700 is the same as S500. Therefore, for the sake of brevity, S700 will not be described in greater detail. If at S700, the MTC UE 103 determines that there is a collision between the PUCCH and PUSCH transmissions, at S710, the MTC UE 103 stops (e.g., discontinues) the transmission of the PUCCH repetitions. Accordingly, the base station 101 may assume a forced NACK message (due to not receiving the PUCCH repetitions) and accordingly resend the PDSCH repetitions on the DL channel.

However, if at S700, the MTC UE 103 determines that there are no collisions between the PUCCH and PUSCH repetitions, at S720, the MTC UE 103 transmits the PUCCH and PUSCH repetitions to the base station 101. Thereafter, the process reverts back to S700 and steps S700 to S720 may then be repeated by the MTC UE 103 for every scheduled PUSCH and/or PUCCH transmissions session.

Figure 8:
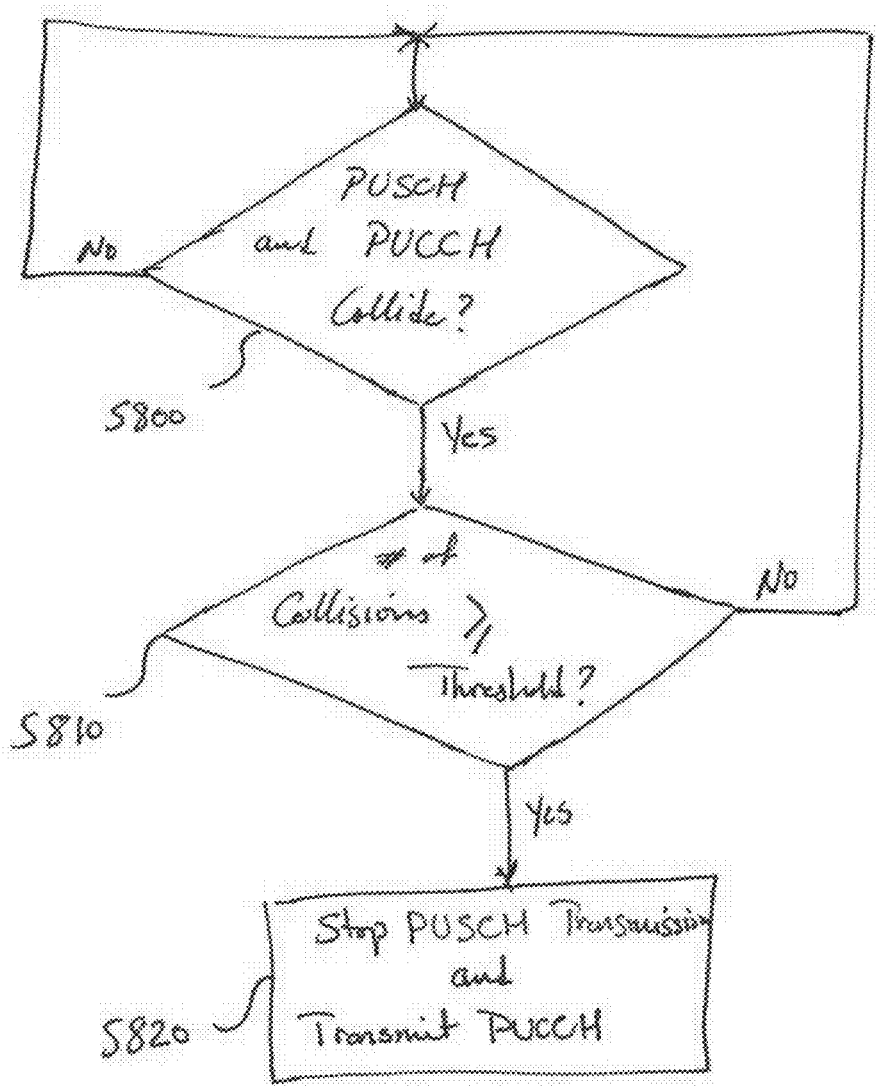
FIG. 8 is a flowchart describing the handling of collisions between PUSCH and PUCCH repetition by a MTC UE, according to one example embodiment.

FIG. 8 is a flowchart describing the handling of collisions between PUSCH and PUCCH repetition by a MTC UE, according to one example embodiment. In FIG. 8, S800 is the same as S500. Therefore, for the sake of brevity, S800 will not be described in greater detail. If at S800, the MTC UE 103 does not detect any collisions between the PUSCH and PUCCH repetitions, the MTC UE 103 may repeat S800 for the next scheduled PUSCH and/or PUCCH transmissions, until the MTC UE 103 detects a collision between the PUSCH and PUCCH repetitions.

If at S800, the MTC UE 103 determines that there is a collision between the PUCCH and PUSCH repetitions, at S810, the MTC UE 103 determines whether the number of collisions is equal to or greater than a threshold over a time window, such as the time window, described above with reference to FIG. 5. The threshold may be a configurable value determined based on empirical studies. A non-limiting example of the value of the threshold is 80%. In one example embodiment and in order to be able to compare the number of collisions to the threshold, the MTC UE 103 may store, in a memory of the MTC UE 103, the number of colliding subframes. Therefore, at S810, the MTC UE 103 may compare the stored number of colliding subframes to the threshold in order to determine whether the number of collisions is greater than the threshold or not.

If at S810, the MTC UE 103 determines that the number of collisions is not equal to or greater than the threshold, the process reverts back to S800. However, if at S810, the MTC UE 103 determines that the number of collisions is greater than the threshold, then at S820, the MTC UE 103 stops (e.g., discontinues) the transmission of the PUSCH repetitions but maintains (continues) transmission of the PUCCH repetitions. Consequently and because the base station 101 is unable to decode the PUSCH (because PUSCH transmissions by the MTC UE 103 have stopped), the base station 101 may assign another UL to the MTC UE 103 for subsequent retransmissions of the PUCCH by the MTC UE 103 to the base station 101.

The process described above with reference to S800-S820 of FIG. 8, may be carried out whenever a scheduled PUSCH and/or PUCCH transmissions session starts.

Figure 9:
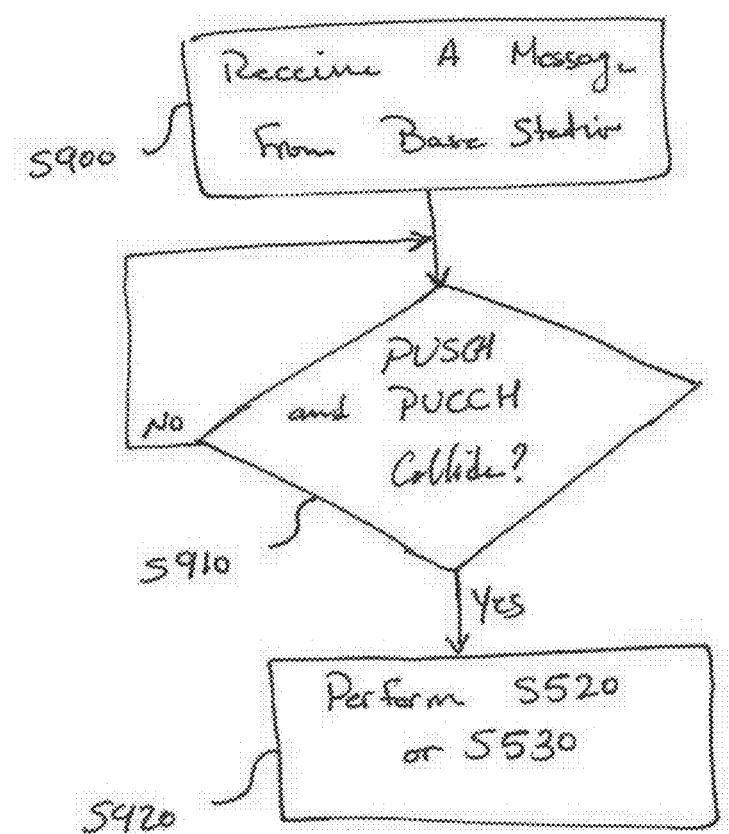
FIG. 9 is a flowchart describing the handling of collisions between PUSCH and PUCCH transmissions by a MTC UE, according to one example embodiment.

FIG. 9 is a flowchart describing the handling of collisions between PUSCH and PUCCH transmissions by a MTC UE, according to one example embodiment. At S900, the MTC UE 103 receives a message from the base station 101. The message may be sent in the DCI included in the EPDCCH sent by the base station 101 to the MTC UE 103. The message may indicate whether the transmission of the PUCCH repetitions is to be delayed or whether the PUCCH is to be piggybacked onto the PUSCH repetitions, in case the MTC UE 103 detects collision(s) between the PUSCH and PUCCH repetitions and the MTC UE 103 determines that the transmissions of the PUCCH and PUSCH are to be adjusted if one or more conditions are satisfied (e.g., threshold numbers of collisions described above with respect to one or more example embodiment).

In FIG. 9, S910 is the same as S500. Therefore, for the sake of brevity, S910 will not be described in greater detail. If at S910, the MTC UE 103 does not detect any collisions between the PUSCH and PUCCH repetitions, the MTC UE 103 may repeat S910 for the next scheduled PUSCH and/or PUCCH transmissions, until the MTC UE 103 detects a collision between the PUSCH and PUCCH repetitions.

However, if at S910, the MTC UE 103 detects collision(s) between the PUSCH and PUCCH repetitions, then the process proceeds to S920. If the message received at S900 indicates that the transmission of the PUCCH repetitions is to be delayed, then at S920, the MTC UE 103 adjusts the transmission of the PUCCH with relative to PUSCH in a same manner as discussed with respect to S520 of FIG. 5.

However, if the message received at S900 indicates that the transmission of the PUCCH repetitions is to be piggybacked onto the transmission of the PUSCH repetitions, then at S920, the MTC UE 103 adjusts the transmission of the PUCCH with relative to PUSCH in a same manner as discussed with respect to S530 of FIG. 5.

In one example embodiment, if the message sent by the base station 101 to the MTC UE 103 indicates that the PUCCH repetitions are to be piggybacked onto the PUSCH repetitions, the MTC UE 103 may then increase the PUSCH repetitions. The MTC UE 103 may increase the PUSCH repetitions because some of the REs of the PUSCH are being used to carry the UCI of the PUCCH to the base station 101. Furthermore and in one example embodiment, the sending of the second message by the base station 101 to the MTC UE 103 enables the base station 101 to control the number of PUSCH repetitions.

The process described above with reference to S900-S920 of FIG. 9, may be carried out whenever a scheduled PUSCH and/or PUCCH transmissions session starts.

As described above, the base station 101 and the one or more MTC UEs 103, each may have a processor and a memory associated therewith, for performing the functionalities described above. The base station 101 and the MTC UEs 103 will be described below with reference to FIGS. 10 and 11.

Figure 10:
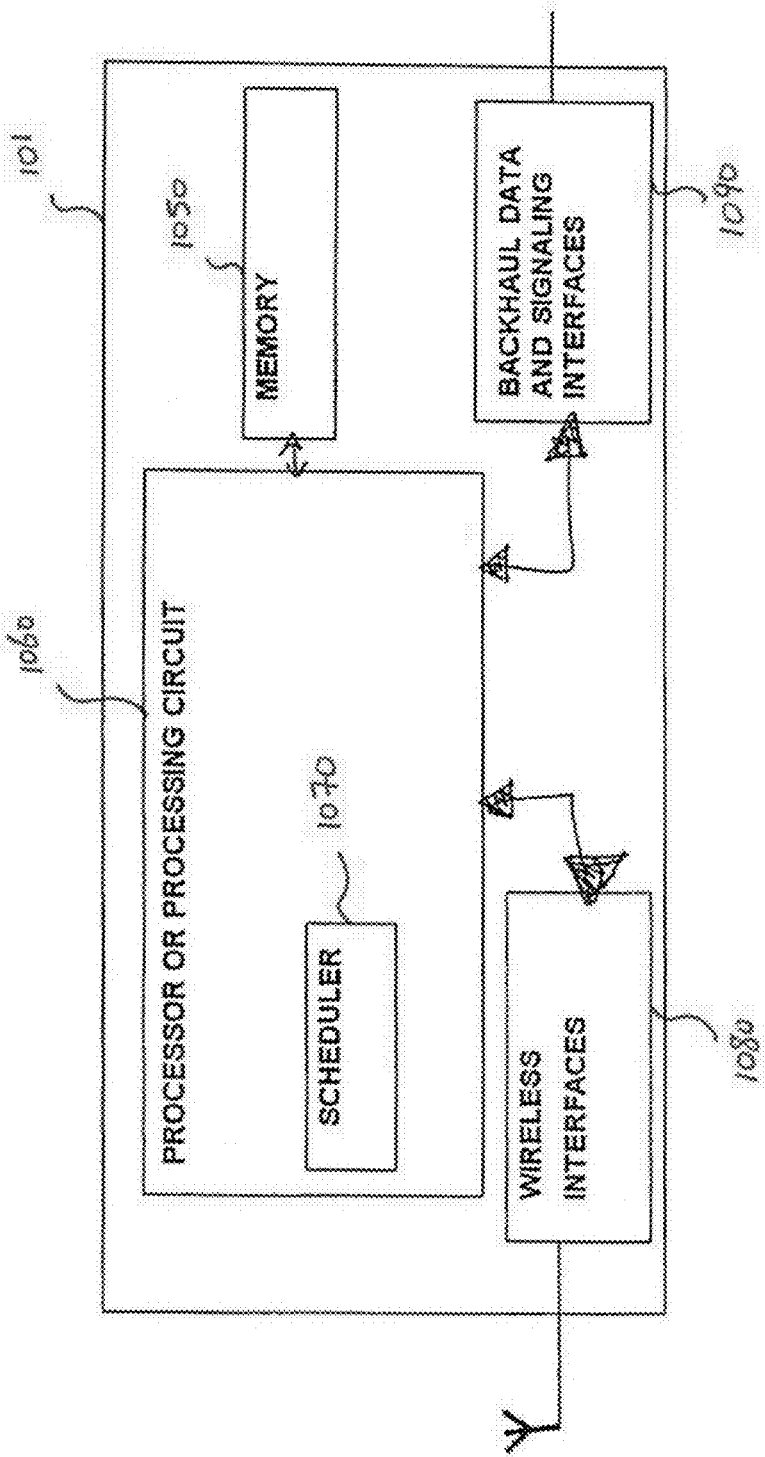
FIG. 10 illustrates a base station shown in FIG. 1, according to one example embodiment.

FIG. 10 illustrates a base station shown in FIG. 1, according to one example embodiment.

Referring to example embodiment shown in FIG. 10, the base station 101 is an eNode B (eNB) that includes a memory 1050, a processor 1060, a scheduler 1070, wireless communication interfaces 1080, and a backhaul data and signaling interfaces (referred to herein as backhaul interface) 1090. The processor or processing circuit 1060 controls the function of the eNB 101 and is operatively coupled to the memory 1050 and the communication interfaces 1080. While only one processor 1060 is shown in FIG. 10, it should be understood that multiple processors may be included in a typical eNB, such as the eNB 101. The functions (i.e., functions described above with respect to FIGS. 2-9) performed by the processor 1060 may be implemented using hardware. As discussed above, such hardware may include one or more Central Processing Units (CPUs), digital signal processors (DSPs), application-specific-integrated-circuits, field programmable gate arrays (FPGAs) computers or the like. The term processor or processing circuit, used throughout this document, may refer to any of these example implementations, though the term is not limited to these examples.

Still referring to FIG. 10, the wireless communication interfaces 1080 (also referred to as communication interfaces 1080) include various interfaces including one or more transmitters/receivers (or transceivers) connected to one or more antennas to wirelessly transmit/receive control and data signals to/from the legacy devices such as the legacy device 102 and/or MTC UE(s) 103, or via a control plane.

The backhaul interface 1090 interfaces with other components (not shown) of the communication network 100 including, but not limited to, a serving gateway (SGW), a mobility management entity (MME), other eNBs, or other Evolved Packet Core (EPC) network elements and/or radio access network (RAN) elements within an IP Packet Data Network (IP-CAN).

The memory 1050 may buffer and store data that is being processed at eNB 101, transmitted and received to and from eNB 101.

Still referring to FIG. 10, the scheduler 1070 schedules control and data communications that are to be transmitted and received by the eNB 101 to and from legacy devices and MTC UEs such as the legacy device 102 and the MTC UEs 103, shown in FIG. 1.

FIG. 11 illustrates a machine type communication system shown in FIG. 1, according to one example embodiment.

Referring to FIG. 11, the MTC UE 103 includes a memory 1155, a processor (or processing circuit) 1165 connected to the memory 1155, various interfaces 1175 connected to the processor 1165, and an antenna 1185 connected to the various interfaces 1175. The various interfaces 1175 and the antenna 1185 may constitute a transceiver for transmitting/receiving data from/to the eNB 101. As will be appreciated, depending on the implementation, the MTC UE 103 may include many more components than those shown in FIG. 11. However, it is not necessary that all of these generally conventional components be shown in order to disclose the illustrative example embodiment.

The memory 1155 may be a computer readable storage medium that generally includes a random access memory (RAM), read only memory (ROM), and/or a permanent mass storage device, such as a disk drive. The memory 1155 also stores an operating system and any other routines/ modules/applications for providing the functionalities of the MTC UE 103 (e.g., functionalities of a MTC UE, methods according to the example embodiments, etc.) to be executed by the processor 1165. These software components may also be loaded from a separate computer readable storage medium into the memory 1155 using a drive mechanism (not shown). Such separate computer readable storage medium may include a disc, tape, DVD/CD-ROM drive, memory card, or other like computer readable storage medium (not shown). In some embodiments, software components may be loaded into the memory 1155 via one of the various interfaces 1175, rather than via a computer readable storage medium.

The processor 1165 may be configured to carry out instructions of a computer program by performing the arithmetical, logical, and input/output operations of the system. Instructions may be provided to the processor 1165 by the memory 1155.

The various interfaces 1175 may include components that interface the processor 1165 with the antenna 1185, or other input/output components. As will be understood, the interfaces 1175 and programs stored in the memory 1155 to set forth the special purpose functionalities of the MTC UE 103 will vary depending on the implementation of the MTC UE 103.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A machine type communication device configured to transmit uplink control channels in a communication network, the device comprising:
    a memory storing computer-readable instructions; and
    a processor configured to execute the computer-readable instructions to,
        determine whether a first uplink control channel and a second uplink control channel will collide during a transmission from the machine type communication device to the communication network,
        determine whether a number of collisions between the first uplink control channel and the second uplink control channel will be greater than or equal to a threshold number of collisions, and
        adjust the transmission of the second uplink control channel relative to the first uplink control channel according to one of a first type of adjustment or a second type of adjustment based on whether the number of collisions between the first uplink control channel and the second uplink control channel will be greater than or equal to the threshold number of collisions.

2. The machine type communication device of claim 1, wherein the one of the first and second type of adjustment includes delaying the transmission of the second uplink control channel until the transmission of the first uplink control channel is complete.

3. The machine type communication device of claim 1, wherein the one of the first and second type of adjustment includes piggybacking the second uplink control channel onto the first uplink control channel for transmission to the communication network.

4. The machine type communication device of claim 3, wherein the processor is configured to piggyback the second uplink control channel onto the first uplink control channel by mapping samples of the second uplink control channel that will collide with the first uplink control channel, to one or more resource elements in physical resource blocks associated with the first uplink control channel.

5. The machine type communication device of claim 3, wherein the processor is configured to piggyback the second uplink control channel onto the first uplink control channel by puncturing one or more resource elements in physical resource blocks associated with the first uplink control channel, with uplink control information included in the second uplink control channel.

6. The machine type communication device of claim 3, wherein the processor is configured to piggyback the second uplink control channel onto the first uplink control channel by rate-matching resource elements associated with the first uplink control channel around one or more resource elements of the first uplink control channel designated for including uplink control information of the second uplink control channel.

7. The machine type communication device of claim 3, wherein the processor is configured to piggyback the second uplink control channel onto the first uplink control channel by,
    interrupting transmission of the first uplink control channel,
    transmitting uplink control information of the second uplink control channel using resource elements in one or more physical resource blocks associated with the first uplink control channel, and
    resuming the transmission of the first uplink control channel after the transmission of the uplink control information of the second uplink control Channel is completed.

8. The machine type communication device of claim 3, wherein the processor is configured to,
    schedule the transmission of the second uplink control channel prior to the transmission of the first uplink control channel, and
    piggyback the second uplink control channel onto the first uplink control channel by joint encoding uplink control information of the second uplink control channel with device specific information of the machine type communication device, for transmission to the communication network.

9. The machine type communication device of claim 1, wherein the processor is further configured to adjust the transmission of the second uplink control channel by discontinuing the transmission of the second uplink control channel if the processor determines that the first and second uplink control channels will collide during transmission from the machine type communication device to the communication network.

10. The machine type communication device of claim 1, wherein
    the first type of adjustment includes discontinuing the transmission of the second uplink control channel; and
    the processor is further configured to adjust the transmission of the second uplink control channel according to the first type of adjustment if the number of collisions between the first uplink control channel and the second uplink control channel is greater than or equal to the threshold number of collisions.

11. The machine type communication device of claim 1, wherein
    the communication network is a long term evolution (LTE) communication network, the machine type communication device is in an enhanced coverage mode of operation, the first uplink control channel is a physical uplink shared channel (PUSCH), and the second uplink control channel is a physical uplink control channel (PUCCH).

12. The machine type communication device of claim 1, wherein the processor is configured to adjust the transmission of the second uplink control channel relative to the first uplink control channel, based on a message received from a base station, the message indicating a type of adjustment to be made to the transmission of the second uplink control channel relative to the first uplink control channel.

13. A method of transmitting uplink control channels by a machine type communication device in a communication network, the method comprising:

determining, by the machine type communication device, whether a first uplink control channel and a second uplink control channel will collide during transmission by the machine type communication device to the communication network;

determining, by the machine type communication device, whether a number of collisions between the first uplink control channel and the second uplink control channel will be greater than or equal to a threshold number of collisions; and adjusting, by the machine type communication device, the transmission of the second uplink control channel relative to the first uplink control channel according to one of a first type of adjustment or a second type of adjustment based on whether the number of collisions between the first uplink control channel and the second uplink control channel will be greater than or equal to the threshold number of collisions.

14. The method of claim 13, wherein the one of the first and second type of adjustment includes delaying the transmission of the second uplink control channel until the transmission of the first uplink control channel is complete.

15. The method of claim 13, wherein the one of the first and second type of adjustment includes piggybacking the second uplink control channel onto the first uplink control channel for transmission to the communication network.

16. The method of claim 15, wherein the piggybacking includes at least one of, mapping samples of the second uplink control channel that will collide with the first uplink control channel, to one or more resource elements in physical resource blocks associated with the first uplink control channel;

puncturing one or more resource elements in physical resource blocks associated with the first .uplink control channel, with uplink control information included in the second uplink control channel; and rate-matching resource elements associated with the first uplink control channel around one or more resource elements of the first uplink control channel designated for including uplink control information of the second uplink control channel.

17. The method of claim 15, wherein the piggybacking includes, interrupting transmission of the first uplink control channel, transmitting uplink control information of the second uplink control channel using resource elements in one or more physical resource blocks associated with the first uplink control channel, and resuming the transmission of the first uplink control channel after the transmission of the uplink control information of the second uplink control channel is completed.

18. The method of claim 13, wherein the adjusting includes discontinuing the transmission of the second uplink control channel if the processor determines that the first and second uplink control channels will collide during transmission from the machine type communication device to the communication network.

19. The method of claim 13, wherein the first type of adjustment includes discontinuing the transmission of the second uplink control channel; and the adjusting further includes adjusting the transmission of the second uplink control channel according to the first type of adjustment if the number of collisions between the first uplink control channel and the second uplink control channel is greater than or equal to the threshold number of collisions.

* * * * *